(12) United States Patent
Asakura et al.

(10) Patent No.: US 11,239,508 B2
(45) Date of Patent: Feb. 1, 2022

(54) BATTERY PACK

(71) Applicant: TOYOTA JIDOSHA KABUSHIKI KAISHA, Toyota (JP)

(72) Inventors: Kazuma Asakura, Okazaki (JP); Shigeyuki Inoue, Toyota (JP); Hirotaka Watanabe, Toyota (JP); Yasuyuki Takei, Toyota (JP); Yusuke Kuruma, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 299 days.

(21) Appl. No.: 16/363,469

(22) Filed: Mar. 25, 2019

(65) Prior Publication Data
US 2019/0305390 A1  Oct. 3, 2019

(30) Foreign Application Priority Data

Mar. 30, 2018  (JP) .............................. JP2018-066563

(51) Int. Cl.
*H01M 10/613* (2014.01)
*H01M 10/625* (2014.01)
(Continued)

(52) U.S. Cl.
CPC ....... *H01M 10/613* (2015.04); *H01M 10/625* (2015.04); *H01M 10/6556* (2015.04); *H01M 10/6557* (2015.04); *H01M 10/6561* (2015.04); *H01M 10/6563* (2015.04); *H01M 50/249* (2021.01); *H01M 2220/20* (2013.01)

(58) Field of Classification Search
CPC ............ H01M 10/6563–6565; H01M 10/6557
See application file for complete search history.

(56) References Cited

U.S. PATENT DOCUMENTS

2003/0211384 A1* 11/2003 Hamada .............. H01M 10/617
429/120
2009/0317695 A1* 12/2009 Wood .................. H01M 10/613
429/53

(Continued)

FOREIGN PATENT DOCUMENTS

CN    103081166 B    7/2015
CN    103068606 B    9/2015
(Continued)

OTHER PUBLICATIONS

Machine translation of JP 2008-269985 A (Year: 2008).*
Machine translation of JP 2001-155789 A (Year: 2001).*

*Primary Examiner* — Robert S Carrico
(74) *Attorney, Agent, or Firm* — Sughrue Mion, PLLC

(57) ABSTRACT

A battery pack includes: a cell stack; a first duct and a second duct configured to feed cooling air toward the cell stack; and a housing case. The first duct and the second duct extend in a first direction and are spaced apart from each other in a second direction, the first direction being parallel to a front-back direction of a vehicle in a mounted state in which the battery pack is mounted on the vehicle, the second direction being parallel to a width direction of the vehicle in the mounted state. The first duct is arranged on an outer side of the cell stack on one side in the second direction, and the second duct is arranged on an outer side of the cell stack on the other side in the second direction.

7 Claims, 7 Drawing Sheets

(51) Int. Cl.
*H01M 10/6563* (2014.01)
*H01M 10/6557* (2014.01)
*H01M 10/6556* (2014.01)
*H01M 10/6561* (2014.01)
*H01M 50/249* (2021.01)

(56) References Cited

U.S. PATENT DOCUMENTS

| | | |
|---|---|---|
| 2013/0202936 A1 | 8/2013 | Kosaki et al. |
| 2013/0241493 A1 | 9/2013 | Kosaki et al. |
| 2013/0244068 A1 | 9/2013 | Kuroda |
| 2013/0266840 A1* | 10/2013 | Fujii .................. H01M 10/647 429/120 |
| 2019/0074561 A1 | 3/2019 | Schwarzer et al. |

FOREIGN PATENT DOCUMENTS

| | | |
|---|---|---|
| DE | 102011001371 A1 | 9/2012 |
| JP | 2001155789 A * | 6/2001 |
| JP | 2005-19231 A | 1/2005 |
| JP | 2008269985 A * | 11/2008 |
| JP | 2011-116321 A | 6/2011 |
| JP | 2013-48083 A | 3/2013 |
| JP | 5321836 B2 | 10/2013 |
| JP | 2018-18738 A | 2/2018 |
| WO | 2017/194305 A1 | 11/2017 |

* cited by examiner

BATTERY PACK

This nonprovisional application is based on Japanese Patent Application No. 2018-066563 filed on Mar. 30, 2018 with the Japan Patent Office, the entire contents of which are hereby incorporated by reference.

BACKGROUND

Field

The present disclosure relates to a battery pack, and particularly to a battery pack mounted on a vehicle.

Description of the Background Art

A battery pack configured to supply electric power to a motor is mounted on an electric vehicle or a hybrid vehicle. The battery pack mainly includes a cell stack including a plurality of serially connected cells, and a case configured to house the cell stack. The plurality of cells generate heat as a result of charging and discharging, and thus, when the temperature of the plurality of cells becomes high, the output characteristics of the cell stack decrease. Therefore, the plurality of cells are cooled in the battery pack.

For example, Japanese Patent Laying-Open No. 2011-116321 discloses a secondary battery configured such that a plurality of cells can be cooled.

The battery pack disclosed in Japanese Patent Laying-Open No. 2011-116321 has a longitudinal shape having a shorter side direction and a longer side direction, and in a central portion of the battery pack in the shorter side direction, an air path is provided along the longer side direction. A cell stack is disposed below the air path, and the cell stack is cooled when the cooling air blown from the one end side toward the other end side in the longer side direction moves to the lower side and moves from the other end side to the one end side in the longer side direction.

SUMMARY

In recent years, the widespread use of electric vehicles has accelerated. High output is required for a battery pack mounted on an electric vehicle, which leads to an increase in the number of mounted cells. Therefore, a cell stack increases in size, and thus, the battery pack also increases in size. In addition, a total sum of an amount of heat generation as a result of charging and discharging increases.

In the configuration disclosed in Japanese Patent Laying-Open No. 2011-116321, the cooling performance is not sufficient when the number of cells increases. In addition, when the battery pack increases in size, a side surface of a vehicle comes close to a side surface of the battery pack. Therefore, when the battery pack is mounted on the vehicle without taking any measures, shock is likely to be provided to the cell stack when the vehicle receives side collision.

The present disclosure has been made in light of the above-described problem, and an object of the present disclosure is to provide a battery pack that makes it possible to suppress shock provided to a cell stack at the time of side collision, while ensuring the cooling performance.

A battery pack of the present disclosure is mounted on a vehicle and includes: at least one cell stack; a first duct and a second duct configured to feed cooling air toward the at least one cell stack; and a housing case configured to house the at least one cell stack, the first duct and the second duct. The first duct and the second duct extend in a first direction and are spaced apart from each other in a second direction, the first direction being parallel to a front-back direction of the vehicle in a mounted state in which the battery pack is mounted on the vehicle, the second direction being parallel to a width direction of the vehicle in the mounted state. The first duct is arranged on an outer side of the at least one cell stack on one side in the second direction, and the second duct is arranged on an outer side of the at least one cell stack on the other side in the second direction.

According to the above-described configuration, in the mounted state in which the battery pack is mounted on the vehicle, the first duct is arranged on one side of the cell stack in the width direction of the vehicle, and the second duct is arranged on the other side of the cell stack in the width direction of the vehicle. Therefore, when the vehicle having the battery pack mounted thereon receives side collision from the width direction of the vehicle, one of the first duct and the second duct absorbs shock, and thus, the shock provided to the cell stack can be reduced.

Furthermore, the cell stack in the housing case is cooled using the first duct and the second duct, and thus, an air volume of the cooling air fed toward the cell stack can be increased. As a result, the cooling performance for the cell stack can be ensured, even when the number of cells increases and the cell stack increases in size.

In the battery pack of the present disclosure, the at least one cell stack may include a plurality of cell stacks. In this case, the plurality of cell stacks are preferably spaced apart from one another and arranged side by side in the first direction, and gaps, each provided between the cell stacks adjacent to each other, are preferably spaced apart from one another and arranged side by side in the first direction. The first duct may have a first main duct extending along the first direction, and at least one first sub duct branching off from the first main duct, and the second duct may have a second main duct extending along the first direction, and at least one second sub duct branching off from the second main duct. In this case, the first sub duct preferably extends toward the second main duct, and the second sub duct preferably extends toward the first main duct. Furthermore, the first sub duct or the second sub duct is preferably arranged in the gap, and the gap where the first sub duct is arranged and the gap where the second sub duct is arranged are preferably alternately arranged side by side along the first direction.

According to the above-described configuration, as to the gaps between the cell stacks spaced apart from one another and arranged side by side in the first direction, the gap where the first sub duct is arranged and the gap where the second sub duct is arranged are alternately arranged side by side along the first direction (vehicle front-back direction), when the cooling air is fed toward the plurality of cell stacks by using the first sub duct and the second sub duct.

As described above, the first sub duct and the second sub duct are alternately arranged side by side in the first direction. Thus, a pressure loss in the first duct and a pressure loss in the second duct can be substantially the same, as compared with the case in which the plurality of first sub ducts are arranged on one side in the first direction and the plurality of second sub ducts are arranged on the other side in the first direction.

Therefore, when the air is blown into the first duct and the second duct by using a blower, a load applied to the blower can be distributed, as compared with the case in which the plurality of first sub ducts and the plurality of second sub ducts are arranged in a one-sided manner. As a result, energy saving can be achieved and the plurality of cell stacks can be cooled.

The battery pack of the present disclosure may further include a connection member configured to electrically serially connect the plurality of cell stacks. In this case, a first space is preferably provided between a tip of the first sub duct and the second main duct, and a second space is preferably provided between a tip of the second sub duct and the first main duct. Furthermore, the connection member preferably includes a first connection portion configured to extend through the first space and connect the cell stacks adjacent to each other so as to sandwich the gap where the first sub duct is arranged, and a second connection portion configured to extend through the second space and connect the cell stacks adjacent to each other so as to sandwich the gap where the second sub duct is arranged.

According to the above-described configuration, when the plurality of cell stacks are electrically serially connected, the first connection portion can be passed through the first space provided between the tip of the first sub duct and the second main duct, to thereby connect the cell stacks adjacent to each other so as to sandwich the first sub duct. Similarly, the second connection portion can be passed through the second space provided between the tip of the second sub duct and the first main duct, to thereby connect the cell stacks adjacent to each other so as to sandwich the second sub duct. As a result, the plurality of cell stacks can be easily electrically connected without interfering with the first sub duct and the second sub duct, and the space in the housing case can be efficiently utilized.

In the battery pack of the present disclosure, a flow path area of the first sub duct preferably decreases toward the second main duct, and a flow path area of the second sub duct preferably decreases toward the first main duct.

According to the above-described configuration, the flow path area of each of the first sub duct and the second sub duct decreases toward the tip side, and thus, a pressure of the cooling air flowing through the first sub duct and the second sub duct can be increased toward the tip side. Therefore, weakening of the cooling air on the tip side of the first sub duct and the second sub duct can be suppressed. As a result, the cooling air can be fed substantially uniformly in the second direction, and the cell stacks can be cooled substantially uniformly in the second direction.

In the battery pack of the present disclosure, the plurality of cell stacks may include a plurality of first cell stacks spaced apart from one another and arranged side by side in the first direction, and at least one second cell stack arranged above the plurality of first cell stacks. In this case, the battery pack may further include: a fixing plate arranged between at least a part of the plurality of first cell stacks and the at least one second cell stack in an up-down direction, and having the at least one second cell stack fixed thereto; and a plurality of support portions configured to support the fixing plate, with the plurality of support portions being arranged in the gap between the first cell stacks adjacent to each other. In this case, the plurality of support portions preferably include a first support portion arranged in the gap between the first cell stacks where the first sub duct is arranged. The first support portion may have a rising portion rising along the up-down direction, a top portion extending from an upper end side of the rising portion toward one side in the first direction, and a bottom portion extending from a lower end side of the rising portion toward the other side in the first direction. In this case, the top portion is preferably fixed to the fixing plate, and the rising portion is preferably arranged between the first sub duct and the first cell stack adjacent to the first sub duct on the one side in the first direction with respect to the first sub duct, and the bottom portion is preferably fixed to the housing case on a lower side of the first sub duct.

In the above-described configuration in which the plurality of cell stacks are arranged in two stages in the up-down direction and the fixing plate fixing the at least one second cell stack located on the upper stage side is supported by the plurality of support portions arranged in the gap between the first cell stacks, a space for disposing the support portions is narrow because the first sub duct or the second sub duct is arranged in the gap between the first cell stacks adjacent to each other.

In this case, of the plurality of support portions, the first support portion arranged in the gap between the first cell stacks where the first sub duct is arranged is formed in the Z shape so as to include the top portion, the rising portion and the bottom portion. In this case, the top portion is fixed to the fixing plate, and the rising portion is arranged between the first sub duct and the first cell stack adjacent to the first sub duct on the one side in the first direction with respect to the first sub duct, and the bottom portion is fixed to the housing case on the lower side of the first sub duct. As a result, the fixing plate can be stably supported even in a narrow space.

In the battery pack of the present disclosure, the at least one cell stack may include a plurality of cell stacks. The plurality of cell stacks may include at least one first cell stack, and at least one second cell stack arranged above the at least one first cell stack. In this case, the first duct preferably has a first main duct extending along the first direction, and a first branch duct branching off from the first main duct so as to be located above the first main duct, and the second duct preferably has a second main duct extending along the first direction, and a second branch duct branching off from the second main duct so as to be located above the second main duct. Furthermore, in this case, the first main duct is preferably arranged on the outer side of the at least one first cell stack on the one side in the second direction, and the second main duct is preferably arranged on the outer side of the at least one first cell stack on the other side in the second direction. Furthermore, the first branch duct is preferably arranged on the outer side of the at least one second cell stack on the one side in the second direction, and the second branch duct is preferably arranged on the outer side of the at least one second cell stack on the other side in the second direction.

According to the above-described configuration, when the plurality of cell stacks are arranged in two stages in the up-down direction, the first main duct is arranged on the one side of the first cell stack in the width direction of the vehicle, and the second main duct is arranged on the other side of the first cell stack in the width direction of the vehicle, on the lower stage side. On the upper stage side, the first branch duct is arranged on the one side of the at least one second cell stack in the width direction of the vehicle, and the second branch duct is arranged on the other side of the at least one second cell stack in the width direction of the vehicle.

Therefore, when the vehicle having the battery pack mounted thereon receives side collision from the width direction of the vehicle, one of the first main duct and the second main duct absorbs shock, and thus, the shock provided to the first cell stack can be reduced. On the second cell stack side as well, one of the first branch duct and the second branch duct absorbs shock, and thus, the shock provided to the second cell stack can be reduced.

The battery pack of the present disclosure may include: an electronic device to which a wiring from the at least one cell stack is connected; a first blower configured to blow the cooling air into the first duct; and a second blower configured to blow the cooling air into the second duct. In this case, the first blower and the second blower may be arranged side by side in the second direction in the housing case, and the electronic device may be arranged between the first blower and the second blower.

According to the above-described configuration, when the vehicle receives side collision, the first blower and the second blower absorb shock caused by the collision. Thus, the shock provided to the electronic device can be reduced. As a result, a break of the electronic device can be suppressed and a malfunction of the at least one cell stack electrically connected to the electronic device can be suppressed.

In addition, the first blower can blow the cooling air into the first duct and the second blower can blow the cooling air into the second duct. Therefore, an air volume of the cooling air blown into the first duct and the second duct can be increased. As a result, an air volume of the cooling air circulating through the housing case can be increased and the cooling performance can be enhanced.

In the battery pack of the present disclosure, the electronic device may include a portion located above the first blower and the second blower.

According to the above-described configuration, the electronic device is arranged to include the portion located above the first blower and the second blower. Thus, the cooling air flowing from the one side (vehicle back side in the mounted state) in the first direction toward the other side (vehicle front side in the mounted state) in the first direction can be directed toward the first blower and the second blower by the electronic device. As a result, the directed cooling air can be effectively sucked by the first blower and the second blower, and the cooling air in the battery pack can be effectively circulated.

In the battery pack of the present disclosure, the electronic device is preferably arranged above a bottom portion of the housing case.

Generally, the housing case is substantially hermetically sealed and condensation may in some cases occur in the housing case due to a temperature difference from the outside air. The condensation water generated as a result of condensation moves by gravity, and thus, is likely to accumulate in the bottom portion of the housing case.

According to the above-described configuration, the electronic device is arranged above the bottom portion of the housing case. Thus, adhesion of the condensation water to the electronic device is suppressed. As a result, a short circuit of the electronic device caused by the condensation water can be suppressed.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
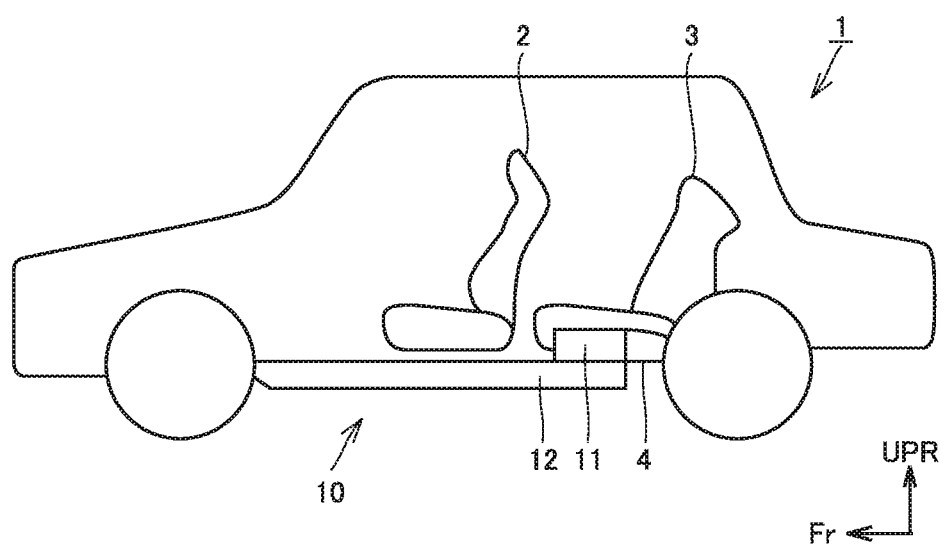
FIG. 1 is a schematic view showing a vehicle on which a battery pack according to an embodiment is mounted.

An embodiment of the present disclosure will be described in detail hereinafter with reference to the drawings. In the embodiment described below, the same or common portions are denoted by the same reference characters in the drawings, and description thereof will not be repeated. When the number, an amount or the like is mentioned in the embodiment described below, the scope of the present disclosure is not necessarily limited to the number, the amount or the like unless otherwise specified.

Embodiment

FIG. 1 is a schematic view showing a vehicle on which a battery pack according to an embodiment is mounted. A vehicle 1 having a battery pack 10 mounted thereon will be described with reference to FIG. 1.

As shown in FIG. 1, vehicle 1 is an electric vehicle and includes an electric motor as a prime mover for driving the vehicle. Vehicle 1 includes a front seat 2, a rear seat 3, a floor panel 4, and battery pack 10. Battery pack 10 includes an upper portion 11 and a lower portion 12.

An insertion hole through which upper portion 11 of battery pack 10 is inserted is provided in floor panel 4 located below rear seat 3.

In a mounted state in which battery pack 10 is mounted on vehicle 1, upper portion 11 is inserted through the above-described insertion hole into a vehicle cabin and is located directly below rear seat 3. In addition, in the above-described mounted state, lower portion 12 is located below floor panel 4.

Figure 2:
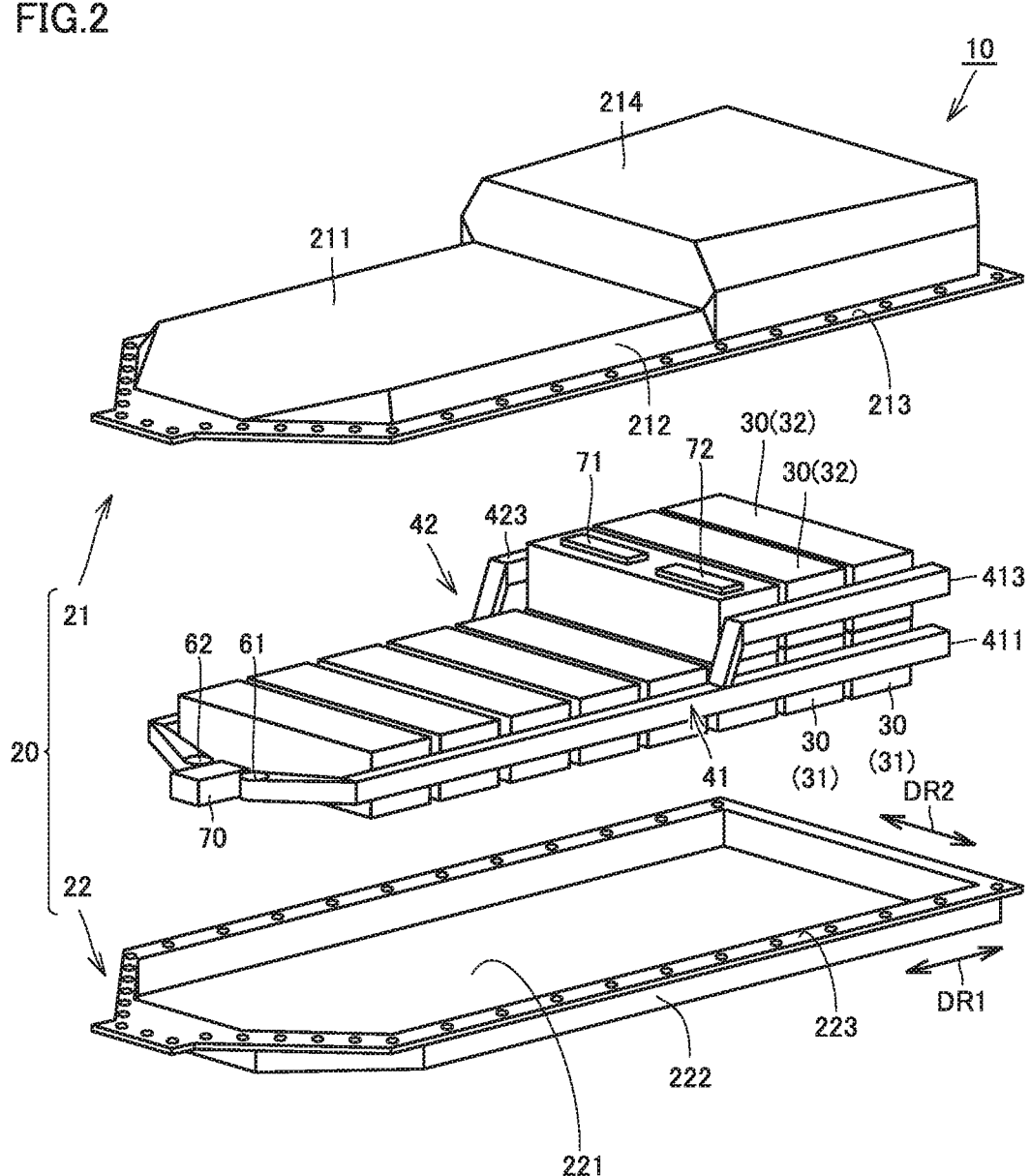
FIG. 2 is an exploded perspective view of the battery pack according to the embodiment.
Figure 3:
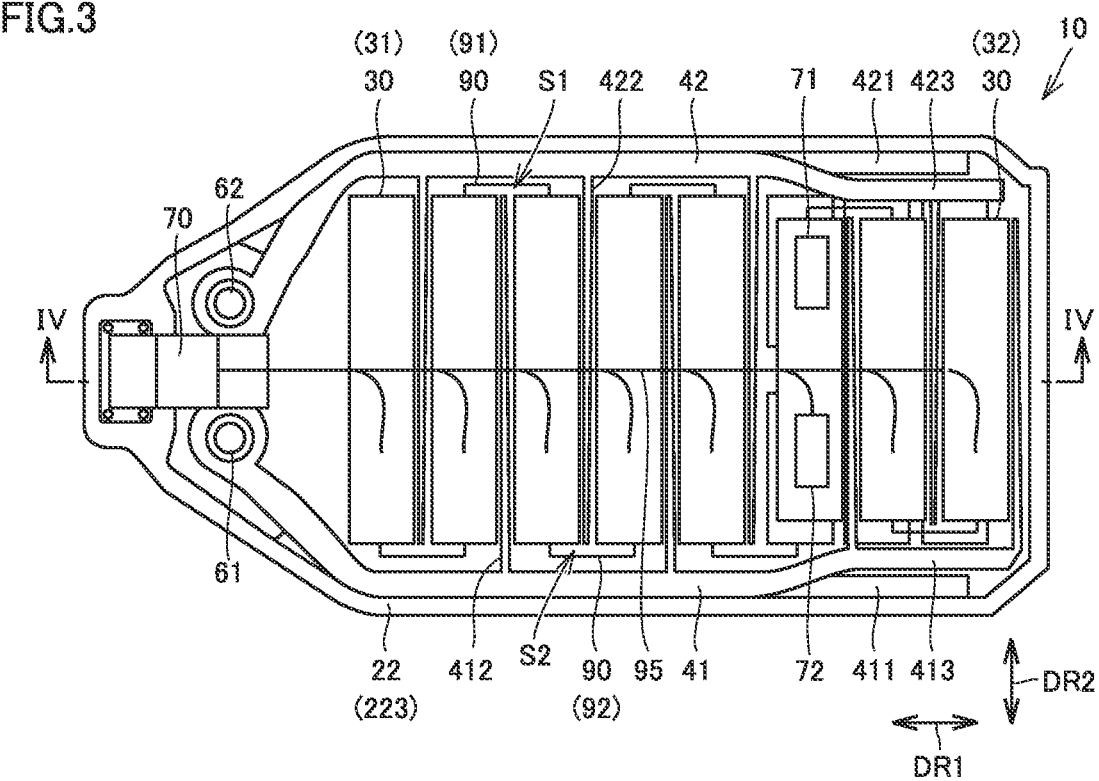
FIG. 3 is a plan view of the battery pack according to the embodiment, with an upper case removed.
Figure 4:
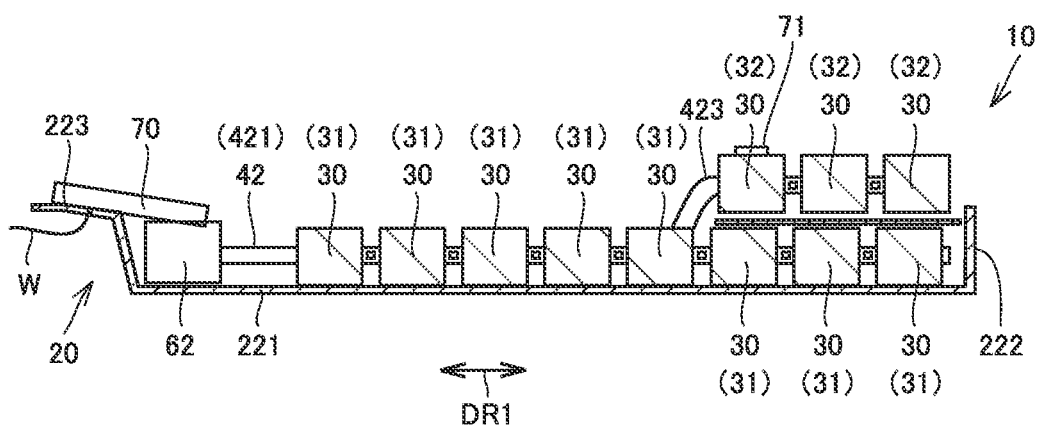
FIG. 4 is a cross-sectional view of the battery pack taken along line IV-IV shown in FIG. 3.

FIG. 2 is an exploded perspective view of the battery pack according to the embodiment. FIG. 3 is a plan view of the battery pack according to the embodiment, with an upper case removed. FIG. 4 is a cross-sectional view of the battery pack taken along line IV-IV shown in FIG. 3. A configuration of battery pack 10 will be described with reference to FIGS. 2 to 4.

As shown in FIGS. 2 to 4, battery pack 10 includes a housing case 20, a plurality of cell stacks 30, a first duct 41, a second duct 42, a first blower 61, a second blower 62, electronic devices 70, 71 and 72, and a connection member 90.

Housing case 20 has a longitudinal shape. Housing case 20 extends along a first direction (DR1 direction). The first direction is parallel to a front-back direction of vehicle 1 in the mounted state in which battery pack 10 is mounted. A second direction (DR2 direction) orthogonal to the first direction is parallel to a width direction of vehicle 1 in the above-described mounted state.

Housing case 20 houses first duct 41, second duct 42, first blower 61, second blower 62, electronic devices 70, 71 and 72, and connection member 90. Housing case 20 includes an upper case 21 and a lower case 22.

Upper case 21 has a substantially box shape that is open downwardly. Upper case 21 has a ceiling portion 211, a peripheral wall portion 212 and a flange portion 213. Ceiling portion 211 has an upwardly-raised portion 214 on one side in the first direction. A plurality of second cell stacks 32 described below are housed in raised portion 214. Peripheral wall portion 212 is provided to extend from a peripheral edge of ceiling portion 211. Flange portion 213 is provided to bend outward from the lower end side of peripheral wall portion 212.

Lower case 22 has a substantially foil shape that is open upwardly. Lower case 22 has a bottom portion 221, a peripheral wall portion 222 and a flange portion 223. Bottom portion 221 is provided to face ceiling portion 211. Peripheral wall portion 222 is provided to extend upwardly from a peripheral edge of bottom portion 221. Flange portion 223 is provided to bend outward from the upper end side of peripheral wall portion 222.

With a lower surface of flange portion 213 and an upper surface of flange portion 223 being in contact with each other, flange portion 213 and flange portion 223 are fastened by a plurality of fastening members. Upper case 21 and lower case 22 are thus coupled to each other.

The plurality of cell stacks 30 include a plurality of first cell stacks 31 and a plurality of second cell stacks 32. The plurality of first cell stacks 31 are spaced apart from one another and arranged side by side in the first direction. Specifically, eight first cell stacks 31 are spaced apart from one another and arranged side by side in the first direction.

First cell stack 31 is formed of a plurality of cells arranged side by side in the second direction. For example, first cell stack 31 is formed of approximately 24 to 30 cells.

The plurality of second cell stacks 32 are spaced apart from one another and arranged side by side in the first direction. Specifically, three second cell stacks 32 are spaced apart from one another and arranged side by side in the first direction. The plurality of second cell stacks 32 are located above the plurality of first cell stacks 31. The plurality of second cell stacks 32 are arranged on one side (vehicle back side in the above-described mounted state) in the first direction.

Second cell stack 32 is formed of a plurality of cells arranged side by side in the second direction. The number of the plurality of cells forming second cell stack 32 may be smaller than the number of the plurality of cells forming first cell stack 31. For example, second cell stack 32 is formed of approximately 21 to 27 cells.

Each cell included in first cell stack 31 and second cell stack 32 is, for example, a secondary battery such as a nickel-metal hydride battery or a lithium ion battery. The cell has, for example, a rectangular shape. The secondary battery may be a battery including a liquid electrolyte, or a battery including a solid electrolyte.

First duct 41 and second duct 42 are configured to feed the cooling air to the plurality of cell stacks 30. First duct 41 and second duct 42 extend along the first direction. First duct 41 and second duct 42 are spaced apart from each other in the second direction. The plurality of cell stacks 30 are arranged between first duct 41 and second duct 42. That is, first duct 41 is arranged on the outer side of the plurality of cell stacks 30 on one side in the second direction, and second duct 42 is arranged on the outer side of the plurality of cell stacks 30 on the other side in the second direction.

First duct 41 and second duct 42 are formed of, for example, a heat insulating member. A resin member having a heat insulating property, a foamed resin member or the like can, for example, be used as the heat insulating member. When first duct 41 and second duct 42 are foamed, external shock can be absorbed and the shock provided to the plurality of cell stacks 30 can be suppressed.

By allowing first duct 41 and second duct 42 to have the heat insulating property, a difference between a temperature of first duct 41 and second duct 42 through which the cooling air flows and a temperature in the surrounding atmosphere of first duct 41 and second duct 42 can be reduced. As a result, the occurrence of condensation on outer surfaces of first duct 41 and second duct 42 can be suppressed and adhesion of the condensation water to the plurality of cell stacks 30 can be suppressed.

First duct 41 has a first main duct 411, a plurality of first sub ducts 412 and a first branch duct 413. First main duct 411 extends along the first direction. First branch duct 413 branches off from first main duct 411 such that first branch duct 413 is located above first main duct 411 on one side in the first direction.

The plurality of first sub ducts 412 branch off from first main duct 411. The plurality of first sub ducts 412 extend toward a second main duct 421. A first space S1 is provided between a tip of first sub duct 412 and second main duct 421.

First sub duct 412 is provided such that a flow path area thereof decreases toward the tip side (second main duct 421 side). First sub duct 412 tapers toward the tip side. The plurality of first sub ducts 412 are arranged side by side along the first direction.

First sub ducts 412 may be provided at first branch duct 413. First sub ducts 412 provided at first branch duct 413 extend toward a second branch duct 423. The first space is provided between first sub duct 412 and second branch duct 423.

Second duct 42 has second main duct 421, a plurality of second sub ducts 422 and second branch duct 423. Second main duct 421 extends along the first direction.

Second branch duct 423 branches off from second main duct 421 such that second branch duct 423 is located above second main duct 421 on one side in the first direction.

The plurality of second sub ducts 422 branch off from second main duct 421. The plurality of second sub ducts 422 extend toward first main duct 411. A second space S2 is provided between second sub duct 422 and first main duct 411.

Second sub duct 422 is provided such that a flow path area thereof decreases toward the tip side (first main duct 411 side). Second sub duct 422 tapers toward the tip side. The plurality of second sub ducts 422 are arranged side by side along the first direction.

Second sub ducts 422 may be provided at second branch duct 423. Second sub ducts 422 provided at second branch duct 423 extend toward first branch duct 413.

The plurality of first cell stacks 31 are arranged between first main duct 411 and second main duct 421. That is, first main duct 411 is arranged on the outer side of the plurality of first cell stacks 31 on one side in the second direction, and second main duct 421 is arranged on the outer side of the plurality of first cell stacks 31 on the other side in the second direction.

The plurality of second cell stacks 32 are arranged between first branch duct 413 and second branch duct 423. That is, first branch duct 413 is arranged on the outer side of the plurality of second cell stacks 32 on one side in the second direction, and second branch duct 423 is arranged on the outer side of the plurality of second cell stacks 32 on the other side in the second direction.

First sub duct 412 or second sub duct 422 is arranged in a gap between cell stacks 30 adjacent to each other. Specifically, the gaps, each provided between cell stacks 30 adjacent to each other, are spaced apart from one another and arranged side by side in the first direction, and the above-described gap where first sub duct 412 is arranged and the above-described gap where second sub duct 422 is arranged are alternately arranged side by side along the first direction.

Connection member 90 electrically serially connects the plurality of cell stacks 30. Connection member 90 has a first connection portion 91 and a second connection portion 92. When viewed from above, first connection portion 91 extends through above-described first space S and connects cell stacks 30 adjacent to each other so as to sandwich the gap where first sub duct 412 is arranged. When viewed from above, second connection portion 92 extends through above-described second space S2 and connects cell stacks 30 adjacent to each other so as to sandwich the gap where second sub duct 422 is arranged.

As described above, first connection portion 91 is routed to extend through first space S1 and second connection portion 92 is routed to extend through second space S2. Thus, interference with first sub ducts 412 and second sub ducts 422 can be avoided and the plurality of cell stacks 30 can be easily electrically connected. In addition, the space in housing case 20 can be efficiently utilized.

First blower 61 blows the cooling air into first duct 41. Second blower 62 blows the cooling air into second duct 42. First blower 61 and second blower 62 are arranged side by side along the second direction. First blower 61 and second blower 62 are located on the other side (vehicle front side in the mounted state) in the first direction with respect to the plurality of cell stacks 30. A fan and a blower can, for example, be used as first blower 61 and second blower 62.

Each of electronic device 71 and electronic device 72 is arranged above second cell stacks 32. Electronic device 71 and electronic device 72 are arranged side by side in the second direction. Electronic device 71 monitors a state of the plurality of cell stacks 30, for example. Electronic device 71 is, for example, a battery ECU. Electronic device 72 executes charging and discharging control of cell stacks 30, based on battery information obtained by electronic device 71. Electronic device 72 is, for example, a BMS (Battery Management System).

As shown in FIGS. 3 and 4, a wiring 95 from the plurality of cell stacks 30 is connected to electronic device 70. Electronic device 70 is, for example, a junction box. Electronic device 70 is arranged between first blower 61 and second blower 62.

Electronic device 70 is arranged above bottom portion 221 of lower case 22. More specifically, electronic device 70 includes a portion located above first blower 61 and second blower 62.

Electronic device 70 is arranged in a front portion of housing case 20 in the vehicle front-back direction. The front end side of electronic device 70 in the vehicle front-back direction is arranged to overlap with flange portion 223 of lower case 22. The part of flange portion 223 overlapping with the front end side of electronic device 70 is provided with an opening. A harness wire W is drawn through the opening to the outside of housing case 20. As a result, an inverter unit (not shown) and the like arranged on the front side of vehicle 1 can be easily connected to electronic device 70.

Figure 5:
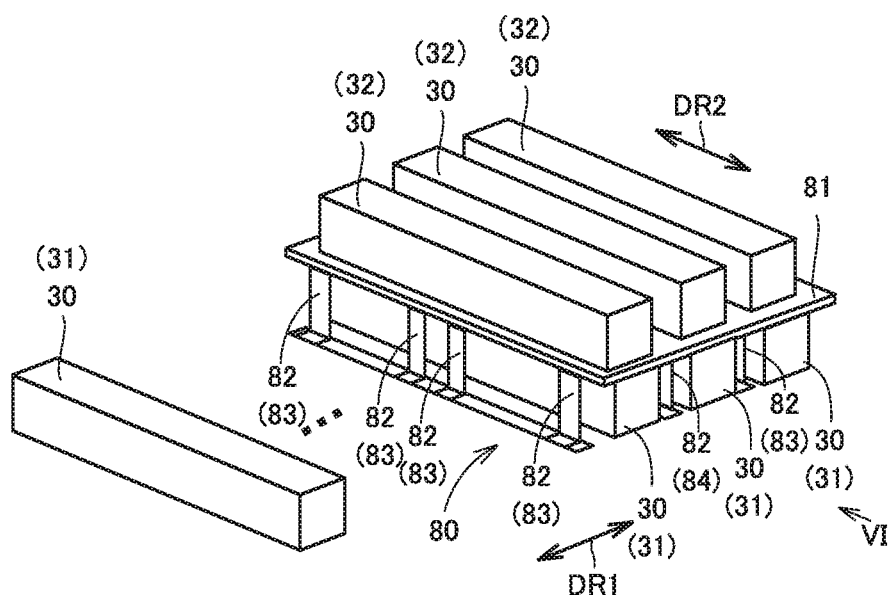
FIG. 5 is a perspective view showing a support structure that supports second cell stacks in the battery pack according to the embodiment.
Figure 6:
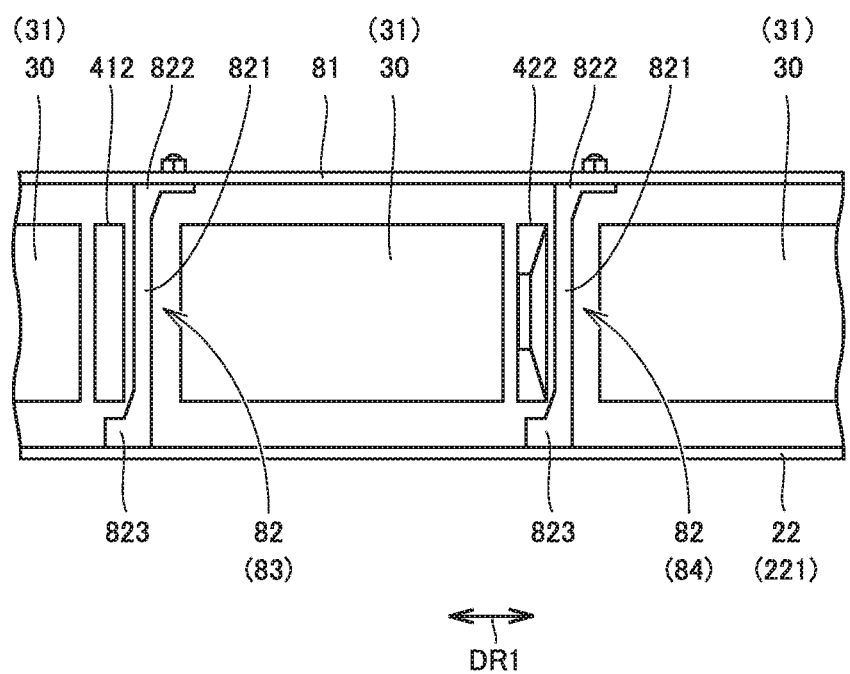
FIG. 6 is a cross-sectional view of the battery pack viewed from arrow VI shown in FIG. 5.

FIG. 5 is a perspective view showing a support structure that supports the second cell stacks in the battery pack according to the embodiment. FIG. 6 is a cross-sectional view of the battery pack viewed from arrow VI shown in FIG. 5. The support structure that supports second cell stacks 32 will be described with reference to FIGS. 5 and 6.

As shown in FIG. 5, battery pack 10 according to the embodiment includes a support structure 80 configured to support second cell stacks 32. Support structure 80 is housed in housing case 20. Support structure 80 includes a fixing plate 81 and a plurality of support portions 82.

Fixing plate 81 is arranged between the plurality of first cell stacks 31 (specifically, three first cell stacks 31) and the plurality of second cell stacks 32 (specifically, three second cell stacks 32) on one side in the first direction. Fixing plate 81 has a substantially flat plate shape that is substantially parallel to the first direction and the second direction. The plurality of second cell stacks 32 are fixed to fixing plate 81.

The plurality of support portions 82 are arranged in a matrix manner. The plurality of support portions 82 support fixing plate 81, with the plurality of support portions 82 being arranged in the gap between first cell stacks 31 adjacent to each other.

The plurality of support portions 82 include a plurality of first support portions 83 and a plurality of second support portions 84. The plurality of first support portions 83 are arranged in the gap between first cell stacks 31 where first sub duct 412 is arranged. The plurality of first support portions 83 are spaced apart from one another and arranged side by side in the second direction. The plurality of second support portions 84 are arranged in the gap between first cell stacks 31 where second sub duct 422 is arranged. The plurality of second support portions 84 are spaced apart from one another and arranged side by side in the second direction.

Support portion 82 has a substantially Z shape. Support portion 82 has a rising portion 821, a top portion 822 and a bottom portion 823. Rising portion 821 is a portion rising along the up-down direction. Top portion 822 extends from the upper end side of rising portion 821 toward one side in the first direction. Top portion 822 is fixed to fixing plate 81 by a fastener and the like. Bottom portion 823 extends from the lower end side of rising portion 821 toward the other side in the first direction. Bottom portion 823 is fixed to lower case 22 by a fastener and the like.

In first support portion 83, rising portion 821 is arranged between first sub duct 412 and first cell stack 31 adjacent to first sub duct 412 on one side in the first direction with respect to first sub duct 412. That is, in the mounted state in which the battery pack is mounted on the vehicle, rising portion 821 is arranged between first sub duct 412 and first cell stack 31 on the vehicle back side of first sub duct 412.

Similarly, in second support portion 84, rising portion 821 is arranged between second sub duct 422 and first cell stack 31 adjacent to second sub duct 422 on one side in the first direction with respect to second sub duct 422. That is, in the above-described mounted state, rising portion 821 is arranged between second sub duct 422 and first cell stack 31 on the vehicle back side of second sub duct 422.

As described above, rising portion 821 is arranged on the back side of first sub duct 412 or second sub duct 422. This makes it possible to suppress disturbance of the cooling air by rising portion 821 when first sub duct 412 and second sub duct 422 feed the cooling air toward the vehicle front side.

In first support portion 83, bottom portion 823 is fixed to bottom portion 221 of housing case 20 on the lower side of first sub duct 412. In second support portion 84, bottom portion 823 is fixed to bottom portion 221 of housing case 20 on the lower side of second sub duct 422.

First sub duct 412 or second sub duct 422 is arranged in the gap between first cell stacks 31 adjacent to each other. Therefore, a space between first sub duct 412 or second sub duct 422 and first cell stack 31 is narrow.

Therefore, in first support portion 83, bottom portion 823 is fixed to housing case 20 on the lower side of first sub duct 412 and top portion 822 is fixed to fixing plate 81, with rising portion 821 being arranged between first sub duct 412 and first cell stack 31 located on the back side of first sub duct 412. Thus, fixing plate 81 can be stably supported even in a narrow space. Similarly, in second support portion 84 as well, fixing plate 81 can be stably supported even in a narrow space.

Since first sub duct 412 has a shape that tapers toward the tip side (second main duct side), a distance between first sub duct 412 and first cell stack 31 located on the back side (one side in the first direction) of first sub duct 412 increases toward the second main duct 421 side. Therefore, in the plurality of first support portions 83 arranged side by side in the second direction, the thickness along the first direction can be increased toward the second main duct 421 side. Therefore, the rigidity of first support portions 83 located on the second main duct 421 side can be made greater than the rigidity of first support portions 83 located on the first main duct 411 side.

In the plurality of second support portions 84 as well, the thickness along the first direction can be increased toward the first main duct 411 side. Therefore, the rigidity of second support portions 84 located on the first main duct 411 side can be made greater than the rigidity of second support portions 84 located on the second main duct 421 side.

In addition, by changing the rigidity of support portions 82 depending on where support portions 82 are disposed, fixing plate 81 can be stably supported.

Figure 7:
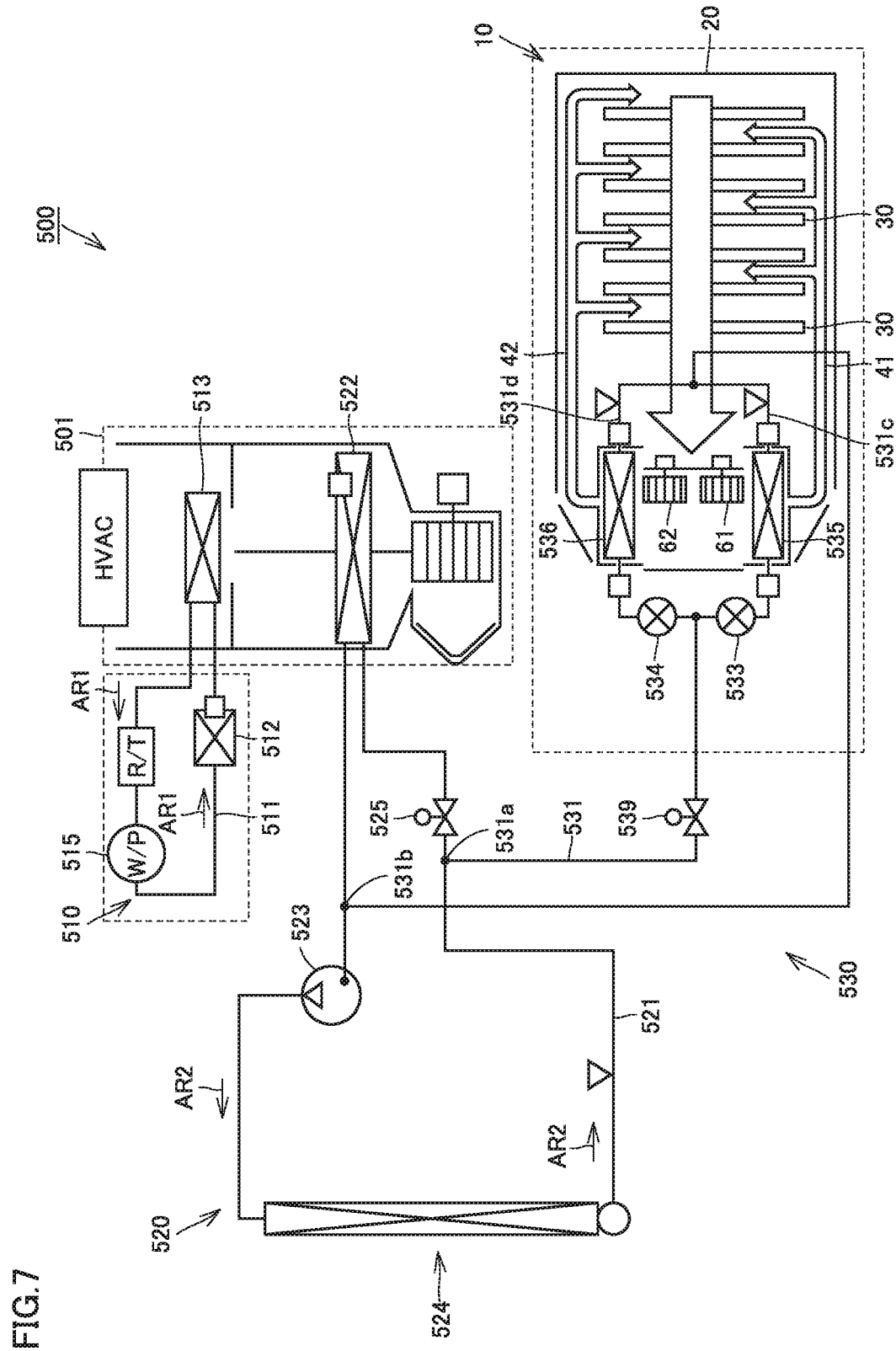
FIG. 7 shows a cooling cycle for cooling the battery pack according to the embodiment.

FIG. 7 shows a cooling cycle for cooling the battery pack according to the embodiment. A cooling cycle 530 for battery pack 10 will be described with reference to FIG. 7.

As shown in FIG. 7, cooling cycle 530 for battery pack 10 uses a cooling cycle 520 in an air conditioner 500 configured to adjust the temperature in the vehicle cabin.

Air conditioner 500 is mounted on vehicle 1. Air conditioner 500 includes an HVAC (Heating Ventilation and Air Conditioning) unit 501, a heating cycle 510 and cooling cycle 520. HVAC unit 501 is configured such that the air used for air conditioning in the vehicle cabin flows.

Heating cycle 510 includes a circulation path 511, a heating heater 512, a heater core 513, and a water pump 515. Heating heater 512, heater core 513 and water pump 515 are connected to circulation path 511 in this order.

A heating medium circulates through circulation path 511. An antifreeze liquid such as, for example, cooling water is used as the heating medium. Water pump 515 allows the heating medium to circulate in an arrow AR1 direction in FIG. 7. Water pump 515 is driven by a conduction motor.

Heating heater 512 heats the heating medium flowing through circulation path 511. An electric heater, a sheath heater, a PTC (Positive Temperature Coefficient) heater or the like is, for example, used as heating heater 512.

Heater core 513 is arranged in HVAC unit 501. Heater core 513 heats the air flowing through HVAC unit 501. The heated air is fed toward the vehicle cabin, and the vehicle cabin is thereby heated.

Cooling cycle 520 includes a circulation path 521, an evaporator 522, an electric compressor 523, a capacitor 524, and an electromagnetic valve 525. Evaporator 522, electric compressor 523, capacitor 524, and electromagnetic valve 525 are connected to circulation path 521 in this order.

A refrigerant circulates through circulation path 521. An HFC refrigerant, an HFO refrigerant or the like can be used as the refrigerant.

Electric compressor 523 allows the refrigerant to circulate in an arrow AR2 direction in FIG. 7. Electric compressor 523 is driven by the conduction motor, and compresses and discharges the refrigerant.

Capacitor 524 cools the refrigerant having a high temperature and a high pressure as a result of compression, and liquefies the refrigerant. A movement path of the refrigerant liquefied by capacitor 524 is switched by electromagnetic valve 525 and an electromagnetic valve 539 described below. When electromagnetic valve 525 is open and electromagnetic valve 539 is closed, the refrigerant liquefied by capacitor 524 moves toward evaporator 522.

The refrigerant having passed through electromagnetic valve 525 is decompressed into mist by an expansion valve or a capillary tube (not shown) before reaching evaporator 522. The mist-like refrigerant is vaporized by evaporator 522. At this time, the refrigerant draws heat from the surroundings, and the air in HVAC unit 501 passing through evaporator 522 is thereby cooled. The cooled air is fed toward the vehicle cabin, and the vehicle cabin is thereby cooled. The vaporized refrigerant is sent to electric compressor 523.

Cooling cycle 530 is connected to cooling cycle 520. Cooling cycle 530 includes a path 531, a first expansion valve 533, a second expansion valve 534, a first evaporator 535, a second evaporator 536, and electromagnetic valve 539.

Path 531 has one end 531*a* and the other end 531*b*, and is routed to pass through battery pack 10.

One end 531*a* of path 531 is connected to circulation path 521 in a portion located on the upstream side of electromagnetic valve 525. Specifically, one end 531*a* of path 531 is connected to circulation path 521 in a portion that connects capacitor 524 and electromagnetic valve 525.

The other end 531*b* of path 531 is connected to circulation path 521 in a portion located on the downstream side of evaporator 522. Specifically, the other end 531*b* of path 531 is connected to circulation path 521 in a portion that connects evaporator 522 and electric compressor 523.

Path 531 branches into a first path 531*c* and a second path 531*d*, and then, first path 531*c* and second path 531*d* join into one in battery pack 10. Electromagnetic valve 539 is provided between a branch point of first and second paths 531*c* and 531*d* and one end 531*a* of path 531.

First expansion valve 533 and first evaporator 535 are provided on first path 531*c*. First evaporator 535 is arranged in first duct 41. Second expansion valve 534 and second evaporator 536 are provided on second path 531*d*. Second evaporator 536 is arranged in second duct 42.

When electromagnetic valve 539 is open and electromagnetic valve 525 is closed, the refrigerant liquefied by capacitor 524 in cooling cycle 520 moves within path 531. With electromagnetic valve 539 and electromagnetic valve 525 being open, the refrigerant may be moved within both path 531 and circulation path 521.

In first path 531*c*, first expansion valve 533 decompresses the refrigerant liquefied by capacitor 524 into mist. The mist-like refrigerant is vaporized by first evaporator 535. At this time, the refrigerant draws heat from the surroundings, and the air in first duct 41 is thereby cooled. The cooled air is fed through first duct 41 to the plurality of cell stacks 30 by first blower 61.

In second path 531*d*, second expansion valve 534 decompresses the refrigerant liquefied by capacitor 524 into mist. The mist-like refrigerant is vaporized by second evaporator 536. At this time, the refrigerant draws heat from the surroundings, and the air in second duct 42 is thereby cooled. The cooled air is fed through second duct 42 to the plurality of cell stacks 30 by second blower 62.

The refrigerant in first path 531*c* and the refrigerant in second path 531*d* vaporized by first evaporator 535 and second evaporator 536 are sent to electric compressor 523.

Figure 8:
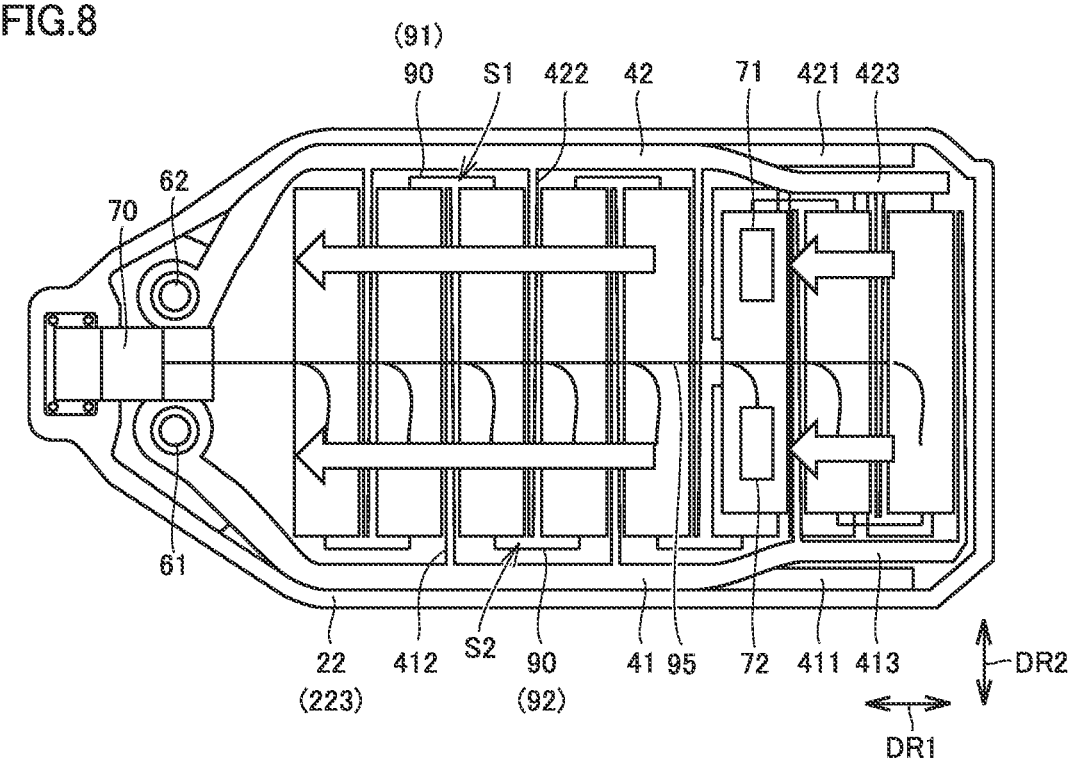
FIG. 8 is a plan view showing an overall flow of the cooling air fed from a first duct and a second duct.

FIG. 8 is a plan view showing an overall flow of the cooling air fed from the first duct and the second duct. The overall flow of the cooling air fed from first duct 41 and second duct 42 will be described with reference to FIG. 8.

As shown in FIG. 8, the cooling air is fed toward cell stacks 30 from first sub ducts 412 and second sub ducts 422 arranged alternately in the gaps between the plurality of cell stacks 30 arranged side by side along the first direction. The cooling air having cooled cell stacks 30 is sucked by first blower 61 and second blower 62 and cooled by first evaporator 535 and second evaporator 536, and then, is again fed toward cell stacks 30 through first duct 41 and second duct 42.

The plurality of first cell stacks 31 are cooled by the cooling air fed from first sub ducts 412 provided at first main duct 411 and second sub ducts 422 provided at second main duct 421.

The plurality of second cell stacks 32 are cooled by the cooling air fed from first sub ducts 412 provided at first branch duct 413 and second sub ducts 422 provided at second branch duct 423. The cooling air having cooled second cell stacks 32 cools electronic device 71 and electronic device 72, and then, joins the cooling air having cooled first cell stacks 31. The cooling air that has joined together cools electronic device 70.

Since electronic devices 70, 71 and 72 can be cooled using the cooling air having cooled cell stacks 30 as described above, cooling of the plurality of cell stacks 30 and cooling of electronic devices 70, 71 and 72 can be both achieved.

Electronic device 70 is a junction box and an amount of heat generation is large. Electronic device 70 having a large amount of heat generation can be cooled using the cooling air that has joined together, and thus, electronic device 70 can be efficiently cooled.

Figure 9:
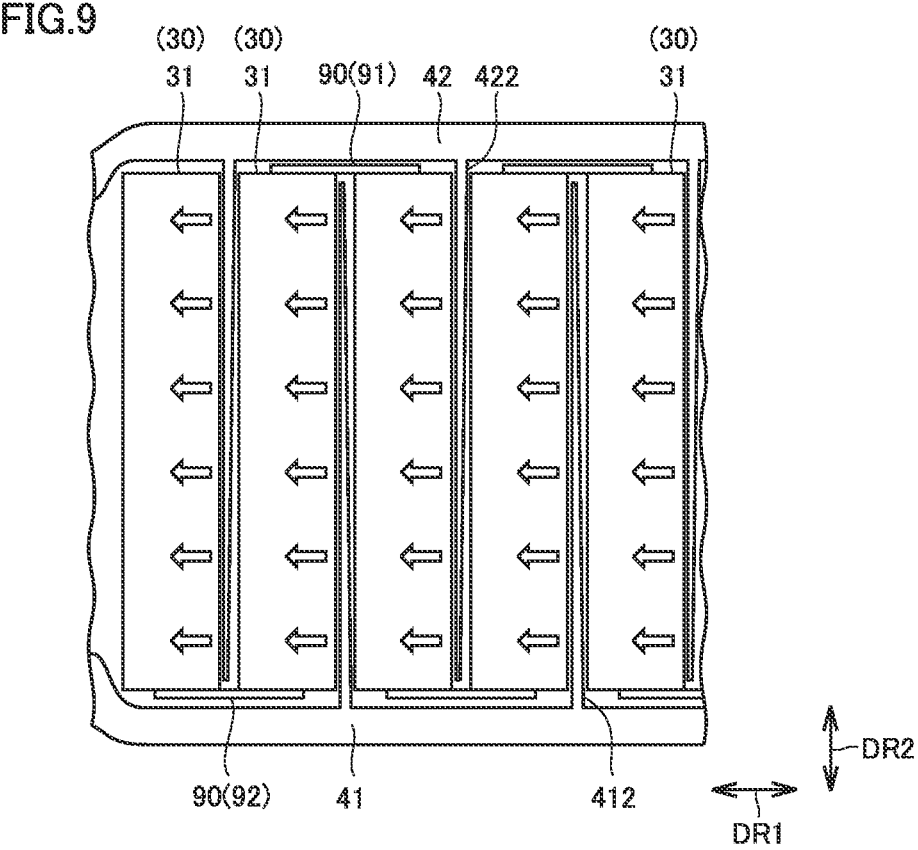
FIG. 9 is a plan view showing the cooling air fed from first sub ducts and second sub ducts.

FIG. 9 is a plan view showing the cooling air fed from the first sub ducts and the second sub ducts. The cooling air fed from first sub ducts 412 and second sub ducts 422 will be described with reference to FIG. 9.

Generally, when the cooling air is blown from first sub ducts 412 and second sub ducts 422, the cooling air is sequentially fed from the base side of first sub ducts 412 and second sub ducts 422, and thus, an air pressure is likely to be lower on the tip side of first sub ducts 412 than on the base side of first sub ducts 412. Therefore, the cooling air fed from the tip side of first sub ducts 412 toward the cell stacks is likely to be weaker than the cooling air fed from the base side of first sub ducts 412 toward the cell stacks.

Thus, when only first sub ducts 412 are provided and the gaps where first sub ducts 412 are arranged are continuously arranged side by side along the first direction, a decline in cooling performance on the second main duct 421 side (the other side in the second direction) is concerned. Similarly, when only second sub ducts 422 are provided and the gaps where second sub ducts 422 are arranged are continuously arranged side by side along the first direction, a decline in cooling performance on the first main duct 411 side (one side in the second direction) is concerned.

In the embodiment, when the gap where first sub duct 412 is arranged and the gap where second sub duct 422 is arranged are alternately arranged side by side along the first direction as shown in FIG. 9, the base side of second sub duct 422 is arranged behind the tip side of first sub duct 412. Similarly, the base side of first sub duct 412 is arranged behind the tip side of second sub duct 422. Therefore, an area where the cooling air is likely to be strong is arranged behind an area where the cooling air is likely to be weak, and thus, the cooling effect can be made substantially uniform as a whole.

In addition, first sub ducts 412 and second sub ducts 422 are alternately arranged side by side in the first direction. Thus, a pressure loss in first duct 41 and a pressure loss in second duct 42 can be substantially the same, as compared with the case in which the plurality of first sub ducts 412 are arranged on one side in the first direction and the plurality of second sub ducts 422 are arranged on the other side in the first direction.

Therefore, when the air is blown into first duct 41 and second duct 42 by using a blower, a load applied to first blower 61 and second blower 62 can be distributed, as compared with the case in which the plurality of first sub ducts 412 and the plurality of second sub ducts 422 are arranged in a one-sided manner. As a result, energy saving can be achieved and the plurality of cell stacks can be cooled.

Furthermore, first sub ducts 412 and second sub ducts 422 are provided such that the flow path area of each of first sub ducts 412 and second sub ducts 422 decreases toward the tip. Therefore, a pressure of the cooling air flowing through first sub ducts 412 and second sub ducts 422 can be increased toward the tip side.

Thus, the cooling air can be fed toward cell stacks 30 substantially uniformly in the second direction and cell stacks 30 can be cooled substantially uniformly. As a result, a temperature gradient of cell stacks 30 in the second direction can be suppressed and a decline in battery characteristics of cell stacks 30 can be suppressed.

Figure 10:
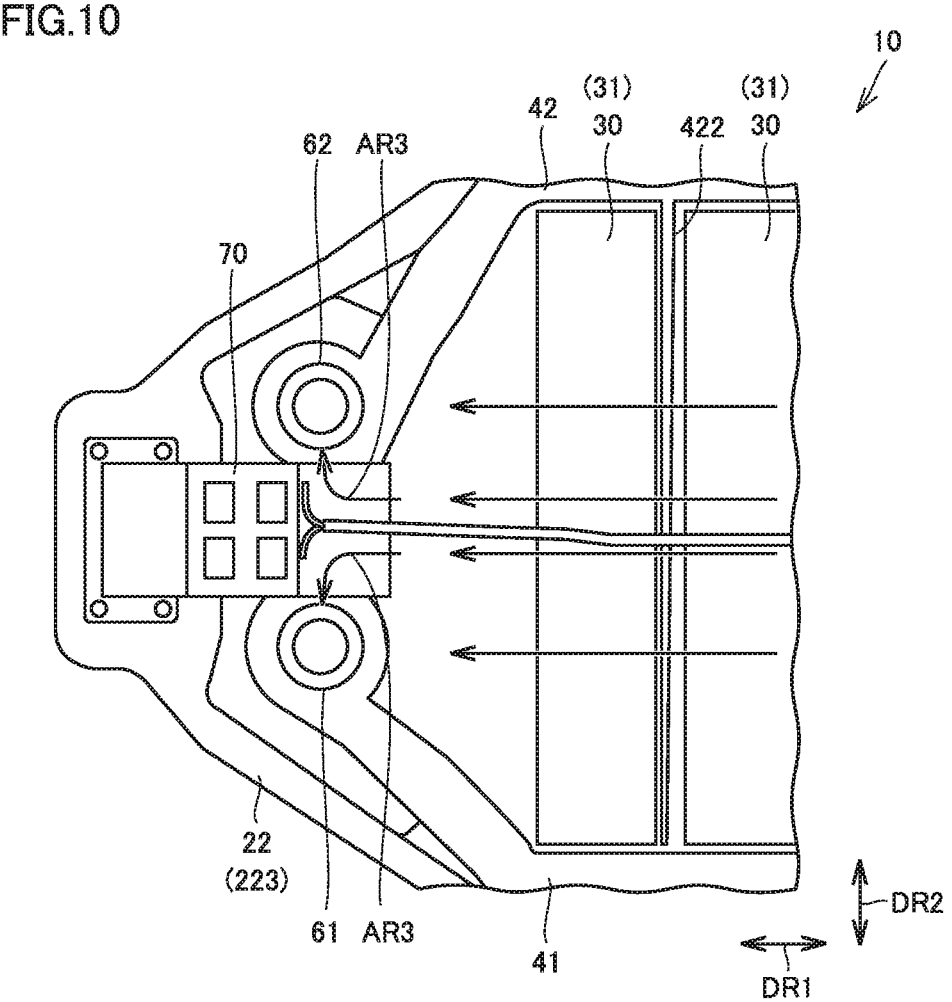
FIG. 10 is a plan view showing a flow of the cooling air in the vicinity of a first blower and a second blower.

FIG. 10 is a plan view showing a flow of the cooling air in the vicinity of the first blower and the second blower. The flow of the cooling air in the vicinity of first blower 61 and second blower 62 will be described with reference to FIG. 10.

The cooling air fed from first duct 41 and second duct 42 is sucked by first blower 61 and second blower 62, together with the air in battery pack 10, and is introduced into first duct 41 and second duct 42.

Electronic device 70 is arranged between first blower 61 and second blower 62 to include a portion located above first blower 61 and second blower 62. Therefore, the cooling air flowing through a central portion in the second direction from one side (vehicle back side in the mounted state) in the first direction toward the other side (vehicle front side in the mounted state) in the first direction can be directed toward first blower 61 and second blower 62 by electronic device 70 as shown by arrow AR3 in FIG. 10. As a result, the directed cooling air can be effectively sucked by first blower 61 and second blower 62, and the air in battery pack 10 can be effectively circulated.

Generally, battery pack 10 is substantially hermetically sealed and condensation may in some cases occur in battery pack 10 due to a temperature difference from the outside air.

Particularly, first evaporator 535 (see FIG. 7) and second evaporator 536 (see FIG. 7) are arranged near first blower 61 and second blower 62, and thus, condensation is likely to occur. In addition, the condensation water generated as a result of condensation moves by gravity, and thus, is likely to accumulate in bottom portion 221 of lower case 22.

In the embodiment, electronic device 70 is arranged above bottom portion 221 of lower case 22. Therefore, adhesion of the above-described condensation water to electronic device 70 is suppressed. As a result, a short circuit of electronic device 70 caused by the condensation water can be suppressed.

As described above, in battery pack 10 according to the embodiment, cell stacks 30 in housing case 20 are cooled using first duct 41 and second duct 42, and thus, an air volume of the cooling air fed toward cell stacks 30 can be increased. As a result, the cooling performance for the cell stacks can be ensured, even when the number of cells increases and the cell stacks increase in size.

In addition, first duct 41 is arranged on one side of cell stacks 30 in the width direction of vehicle 1, and second duct 42 is arranged on the other side of cell stacks 30 in the width direction of vehicle 1. Therefore, when vehicle 1 having battery pack 10 mounted thereon receives side collision from the width direction of vehicle 1, one of first duct 41 and second duct 42 absorbs shock, and thus, the shock provided to cell stacks 30 can be reduced.

More particularly, when the plurality of cell stacks 30 are arranged in two stages in the up-down direction, first main duct 411 is arranged on one side of first cell stacks 31 in the width direction of vehicle 1, and second main duct 421 is arranged on the other side of first cell stacks 31 in the width direction of vehicle 1, on the lower stage side. On the upper stage side, first branch duct 413 is arranged on one side of second cell stacks 32 in the width direction of vehicle 1, and second branch duct 423 is arranged on the other side of second cell stacks 32 in the width direction of vehicle 1.

Therefore, when vehicle 1 receives side collision, one of first main duct 411 and second main duct 421 absorbs shock, and thus, the shock provided to first cell stacks 31 can be reduced. On the second cell stacks 32 side as well, one of first branch duct 413 and second branch duct 423 absorbs shock, and thus, the shock provided to second cell stacks 32 can be reduced.

Furthermore, electronic device 70 is arranged between first blower 61 and second blower 62 in the second direction. Therefore, when vehicle 1 receives side collision, first blower 61 or second blower 62 absorbs shock caused by the collision. Thus, the shock provided to electronic device 70 can be reduced. As a result, a break of electronic device 70 can be suppressed and a malfunction of cell stacks 30 electrically connected to electronic device 70 can be suppressed.

In the above-described embodiment, description has been given, by way of example, of the case in which the plurality of cell stacks 30 are arranged in two stages in the up-down direction, and eight cell stacks 30 are arranged on the lower stage side and three cell stacks 30 are arranged on the upper stage side. However, as long as first duct 41 and second duct 42 are arranged on both outer sides of cell stacks 30 in the second direction, the number of cell stacks 30 is not particularly limited to the above-described number.

Single second cell stack 32 may be arranged in the upper stage and single first cell stack 31 may be arranged in the lower stage. Alternatively, the plurality of cell stacks 30 may be arranged side by side in the first direction in one stage. Single cell stack 30 may be arranged in one stage. When the number of cell stacks 30 varies, the number of first sub ducts 412 and second sub ducts 422 is increased or decreased in accordance with the number of cell stacks 30. Therefore, the number of first sub ducts 412 and second sub ducts 422 may be plural or singular.

In the above-described embodiment, description has been given, by way of example, of the case in which the cooling air is blown to first duct 41 by first blower 61 and the cooling air is blown to second duct 42 by second blower 62. However, the present disclosure is not limited to such a case. The cooling air may be blown to first duct 41 and second duct 42 by one blower. When first blower 61 and second blower 62 are used, an air volume of the cooling air blown to first duct 41 and second duct 42 can be increased. As a result, an air volume of the cooling air circulating through housing case 20 can be increased and the cooling performance can be enhanced.

In the above-described embodiment, description has been given, by way of example, of the case in which the flow path area of each of first sub duct 412 and second sub duct 422 decreases toward the tip. However, the present disclosure is not limited to such a case. The flow path area may be constant from the base portion to the tip.

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A battery pack mounted on a vehicle, the battery pack comprising:
   at least one cell stack;
   a first duct and a second duct configured to feed cooling air toward the at least one cell stack; and
   a housing case configured to house the at least one cell stack, the first duct and the second duct,
   the first duct and the second duct extending in a first direction and being spaced apart from each other in a second direction, the first direction being parallel to a front-back direction of the vehicle in a mounted state in which the battery pack is mounted on the vehicle, the second direction being parallel to a width direction of the vehicle in the mounted state,
   the first duct being arranged on an outer side of the at least one cell stack on one side in the second direction,
   the second duct being arranged on an outer side of the at least one cell stack on the other side in the second direction,
   wherein:
      the at least one cell stack includes a plurality of cell stacks,
      the plurality of cell stacks are spaced apart from one another and arranged side by side in the first direction,
      a plurality of gaps are provided, so that one of the gaps is provided between each of the cell stacks adjacent to each other, and the plurality of gaps are spaced apart from one another and arranged side by side in the first direction,
      the first duct includes: (i) a first main duct extending along the first direction, and (ii) a first sub duct branching off from the first main duct,
      the second duct includes: (i) a second main duct extending along the first direction, and (ii) a second sub duct branching off from the second main duct, the first sub duct extends toward the second main duct,
the second sub duct extends toward the first main duct,
the first sub duct is apart from the second main duct and the second sub duct is apart from the first main duct,
the first sub duct and the second sub duct are arranged in the gaps, and
the gap where the first sub duct is arranged and the gap where the second sub duct is arranged are alternately arranged side by side along the first direction,
the battery pack further comprising:
- a connection member configured to electrically serially connect the plurality of cell stacks, wherein
- a first space is provided between a tip of the first sub duct and the second main duct,
- a second space is provided between a tip of the second sub duct and the first main duct, and
- the connection member includes a first connection portion configured to extend through the first space between the tip of the first sub duct and the second main duct and extend across the gap where the first sub duct is arranged so as to connect the cell stacks adjacent to each other, and a second connection portion configured to extend through the second space between the tip of the second sub duct and the first main duct and extend across the gap where the second sub duct is arranged so as to connect the cell stacks adjacent to each other.

2. The battery pack according to claim 1, wherein
a flow path area of the first sub duct decreases toward the second main duct, and
a flow path area of the second sub duct decreases toward the first main duct.

3. The battery pack according to claim 1, wherein
the plurality of cell stacks include a plurality of first cell stacks spaced apart from one another and arranged side by side in the first direction, and at least one second cell stack arranged above the plurality of first cell stacks,
the battery pack further comprising:
- a fixing plate arranged between at least a part of the plurality of first cell stacks and the at least one second cell stack in an up-down direction, and having the at least one second cell stack fixed thereto; and
- a plurality of support portions configured to support the fixing plate, with the plurality of support portions being arranged in the gap between the first cell stacks adjacent to each other, wherein
the plurality of support portions include a first support portion arranged in the gap between the first cell stacks where the first sub duct is arranged,
the first support portion has a rising portion rising along the up-down direction, a top portion extending from an upper end side of the rising portion toward one side in the first direction, and a bottom portion extending from a lower end side of the rising portion toward the other side in the first direction,
the top portion is fixed to the fixing plate,
the rising portion is arranged between the first sub duct and the first cell stack adjacent to the first sub duct on the one side in the first direction with respect to the first sub duct, and
the bottom portion is fixed to the housing case on a lower side of the first sub duct.

4. The battery pack according to claim 1, wherein
the plurality of cell stacks include at least one first cell stack, and at least one second cell stack arranged above the at least one first cell stack,
the first duct includes a first branch duct branching off from the first main duct so as to be located above the first main duct,
the second duct includes a second branch duct branching off from the second main duct so as to be located above the second main duct,
the first main duct is arranged on the outer side of the at least one first cell stack on the one side in the second direction,
the second main duct is arranged on the outer side of the at least one first cell stack on the other side in the second direction,
the first branch duct is arranged on the outer side of the at least one second cell stack on the one side in the second direction, and
the second branch duct is arranged on the outer side of the at least one second cell stack on the other side in the second direction.

5. The battery pack according to claim 1, further comprising:
an electronic device to which a wiring from the at least one cell stack is connected;
a first blower configured to blow the cooling air into the first duct; and
a second blower configured to blow the cooling air into the second duct, wherein
the first blower and the second blower are arranged side by side in the second direction in the housing case, and
the electronic device is arranged between the first blower and the second blower.

6. The battery pack according to claim 5, wherein
the electronic device includes a portion located above the first blower and the second blower.

7. The battery pack according to claim 5, wherein
the electronic device is arranged above a bottom portion of the housing case.

* * * * *